United States Patent [19]
Hale et al.

[11] Patent Number: 5,143,198
[45] Date of Patent: Sep. 1, 1992

[54] TURNABLE CYLINDER FOR A CONVEYOR SYSTEM

[75] Inventors: Daniel E. Hale, Bartlett; Thomas A. Johnson, Germantown, both of Tenn.

[73] Assignee: Industrial Conveyor Company, Inc., Memphis, Tenn.

[21] Appl. No.: 780,050

[22] Filed: Oct. 21, 1991

[51] Int. Cl.⁵ .............................. B65G 47/24
[52] U.S. Cl. .......................... 198/414; 104/47
[58] Field of Search ............... 198/412–414, 198/465.2, 465.3; 104/37, 47, 48

[56] References Cited

U.S. PATENT DOCUMENTS

| | | | |
|---|---|---|---|
| 853,365 | 5/1907 | Klein | 198/465.3 |
| 2,897,948 | 8/1959 | Cranston, Jr. | 198/33 |
| 3,100,039 | 8/1963 | Oderman et al. | 198/33 |
| 3,322,256 | 5/1967 | Roach | 198/414 |
| 3,442,410 | 5/1969 | Solomonson | 198/414 |
| 3,530,571 | 9/1970 | Perry | 198/465.2 |
| 4,009,306 | 4/1991 | Roderick et al. | 198/414 |
| 4,456,116 | 6/1984 | Jarman | 198/414 |
| 4,519,493 | 5/1985 | Dyer | 198/414 |
| 4,850,472 | 7/1989 | Liebel et al. | 198/465.3 |
| 4,930,623 | 6/1990 | Johnson et al. | 198/465.1 |

FOREIGN PATENT DOCUMENTS 1123962 11/1984 U.S.S.R. .................. 198/414

Primary Examiner—Joseph E. Valenza
Attorney, Agent, or Firm—Shlesinger, Arkwright & Garvey

[57] ABSTRACT

A turntable for a conveyor system includes a cylinder having a longitudinal axis mounted to a stationary base plate; a non-rotatable piston disposed within the cylinder and mounted for reciprocal movement along the longitudinal axis; a bushing disposed about the longitudinal axis of the cylinder for rotatably mounting a plate for supporting an article and a stabilizing device coaxially mounted with the bushing for stabilizing the article supporting device during rotation. The article supporting device is raised and lowered with respect to the base plate by the reciprocal movement of the piston but its rotational movement is independent from that of the piston.

19 Claims, 5 Drawing Sheets

TURNABLE CYLINDER FOR A CONVEYOR SYSTEM

FIELD OF THE INVENTION

The present invention relates in general to apparatus for changing the orientation or alignment of articles being transported by a conveyor system and, more particularly to elevating turntables.

BACKGROUND OF THE INVENTION

In order to transfer articles from one end of an assembly plant or warehouse, conveyor systems are known which include a plurality of intersecting conveying sections and turntables for changing the orientation of articles being conveyed, or the direction of travel thereof, or both. Turntables which are currently available include those designed for rotating articles on a roller conveyor system and/or rotating a conveying section of a conveyor system. With these known systems, the turntable is usually disposed in a gap between two sections of a non-contiguous conveyor. As a result, several drawbacks exist in that complicated turntable structures are needed for realigning or reorienting an article being conveyed.

In particular, the article is handled more than necessary as it moves across at least three conveying sections. For example, articles or loads are received from one conveying section onto a platform of the turntable. The turntable is rotated through a predetermined angle and then the articles are discharged onto a second section of the conveyor system. The transfer or discharging operation may be done manually or automatically via driven rollers. Likewise, the turntable maybe rotated manually or by a power unit. To assist in the rotating operation, turntables can include means for lowering and raising the articles in relation to the conveying sections. Thus, are several mechanisms are required to rotate an object. This could present problems to an assembly process where stability of an object is extremely important and repositioning of the object being conveyed is necessary so that an operator can do precision work from one side of an assembly line.

U.S. Pat. Nos. 2,897,948 to Cranston, Jr. and 3,100,039 to Oderman et al. disclose a turntable including elevating means and a platform where the piston providing the reciprocal movement of the elevating means is spaced from and parallel to the central axis of the platform supporting the load to be reoriented. Consequently, Cranston and Oderman employ an arrangement including an intermediate lever and a cam which indirectly actuates the raising or lowering operation of the turntable platform. A gear and chain arrangement or plurality of air cylinders provides the rotational movement. Not only are these turntables complicated in structure, the reciprocal and rotational movement thereof may jolt the loads which could be detrimental during the assembly of delicate parts (e.g., top heavy articles or electronic components), or the banding of separate items into a single unit. Further, the platforms of such conventional turntables include a plurality of openings spaced to overlie conveying rollers which complete the gap between conveying sections. When such a platform is lowered, the supported article/load rests on the conveying rollers so that articles can be pushed or conveyed between sections. However, these conventional platforms limit the angular orientation of articles to quarter turns. (i.e., 90°, 180°, 270°, 360°).

A powered turntable assembly having five spaced-apart air jack assemblies which raise and lower a turntable platform within a conveying section is taught by U.S. Pat. No. 4,519,493 to Dyer. This multiple jack assembly provides added stability in the extended position enabling an off-centered load to be raised and rotated. But, this turntable is designed for rotations in increments of 90°. Moreover, a larger number of mechanical connections, as well as pneumatic assemblies, are necessary to complete this structure. Thus, the turntable is expensive to manufacture and to maintain in working condition.

U.S Pat. No. 4,456,116 to Jarman discloses a round platform turntable disposed between two roller conveyor sections and two shortened roller sections. By activating a hydraulic cylinder, a piece of sheet metal positioned on the shortened rollers over the lowered platform turntable is raised above the conveying rollers. As a result, the raised sheet metal can be adjusted and aligned with any desired angle by rotating the platform via a shaft attached to the cylinder. Once the sheet metal is rotated the desired angle, the hydraulic cylinder is activated to lower the sheet metal onto the shortened rollers for continued conveying. However, this system is not concerned with heavy loads or ensuring stability of a conveyed article while being raised or in the extended position.

According to Jarman, the shaft is rotatable about the longitudinal axis of the cylinder. Thus, forces due to a load supported on the turntable platform are transferred through the rotatable shaft and are distributed against the side walls of the shaft and/or hydraulic cylinder. Accordingly, the lifting as well as rotation of a heavy load produces friction, which wears the sealing components of the cylinder requiring replacement or repair. Moreover, the side and load thrusts applied by a load's weight during the rotational and reciprocating motions deteriorate the mechanical connection of the rotating shaft which is initially stable, along with the rubber seals or gaskets disposed on either end of the hydraulic cylinder. Consequently, wobbling is associated with the rotation of such rotatable elevating turntables requiring frequent repair and maintenance.

Accordingly, there is a need in the conveyor art for a turntable of simple construction which provides increased stability of a load carried by a platform in an extended position and during rotation. Moreover, there is a need for a turntable that offers infinite flexibility in precision alignment and orientation of conveyed articles.

OBJECTS AND SUMMARY OF THE INVENTION

The principle object of the present invention is to provide a turntable apparatus for a conveyor or system which can lift and rotate a load being conveyed through any desired angle while maintaining a level load-supporting surface.

It is a further object to provide an elevating turntable apparatus with increased load capacity, and a longer operating life thereby minimizing the maintenance costs associated therewith.

It is another object of the present invention to provide an elevating turntable cylinder with increased load capacity which allows the platform supporting a load to freely rotate, without having to rotate the entire piston of the cylinder.

It is further object of the present invention to provide an elevating turntable cylinder which increases the stability of a supported load when the cylinder is in the extended position and has an increased side load capacity over standard air cylinders.

Yet another object of the present invention is to provide an elevating turntable cylinder of simple construction that is inexpensive to manufacture and to maintain.

Another object of the invention is to provide a dual track conveyor system which offers the flexibility of changing the conveying direction of the load by shifting the load from one track section of the conveyor system to another.

In summary, the above objects are achieved by the turntable cylinder of the present invention which includes a cylinder mounted to a stationary base plate, a non-rotatable piston disposed within the cylinder and mounted for reciprocal movement along a longitudinal axis of the cylinder, a bushing mechanism co-axially disposed about the cylinder axis for rotatably mounting a platform for supporting a load, and a stabilizing device for providing smooth rotation and precise re-orientation of a load where the platform is raised and lowered with respect to the base plate by the reciprocal movement of the piston.

The turntable cylinder of the present invention is employed as a device for changing the direction of travel of articles being conveyed on a dual track conveyor system including a first track section for conveying articles in a first direction and a second track section intersecting at an angle with the first track section for conveying the articles in a second direction.

A feature of the present invention is that the bushing mechanism is mounted within a recess formed in the piston providing lateral support and includes two sets of bearings which enable manual rotation of the platform.

A further feature of the invention is that the bushing mechanism of the present invention freely rotates within the piston recess and the turntable cylinder includes elements to temporarily stop and secure the platform against rotation.

Another feature is that the turntable cylinder according to the invention is a full stroke cylinder which provides increased stability of the load when the cylinder is in its extended position.

BRIEF DESCRIPTION OF THE DRAWINGS

The above and other objects, features and advantages of the invention, and a better understanding of its construction and operation will become apparent from the following description taken in conjunction with the accompanying drawings, in which.

DESCRIPTION OF THE PREFERRED EMBODIMENT

Figure 1:
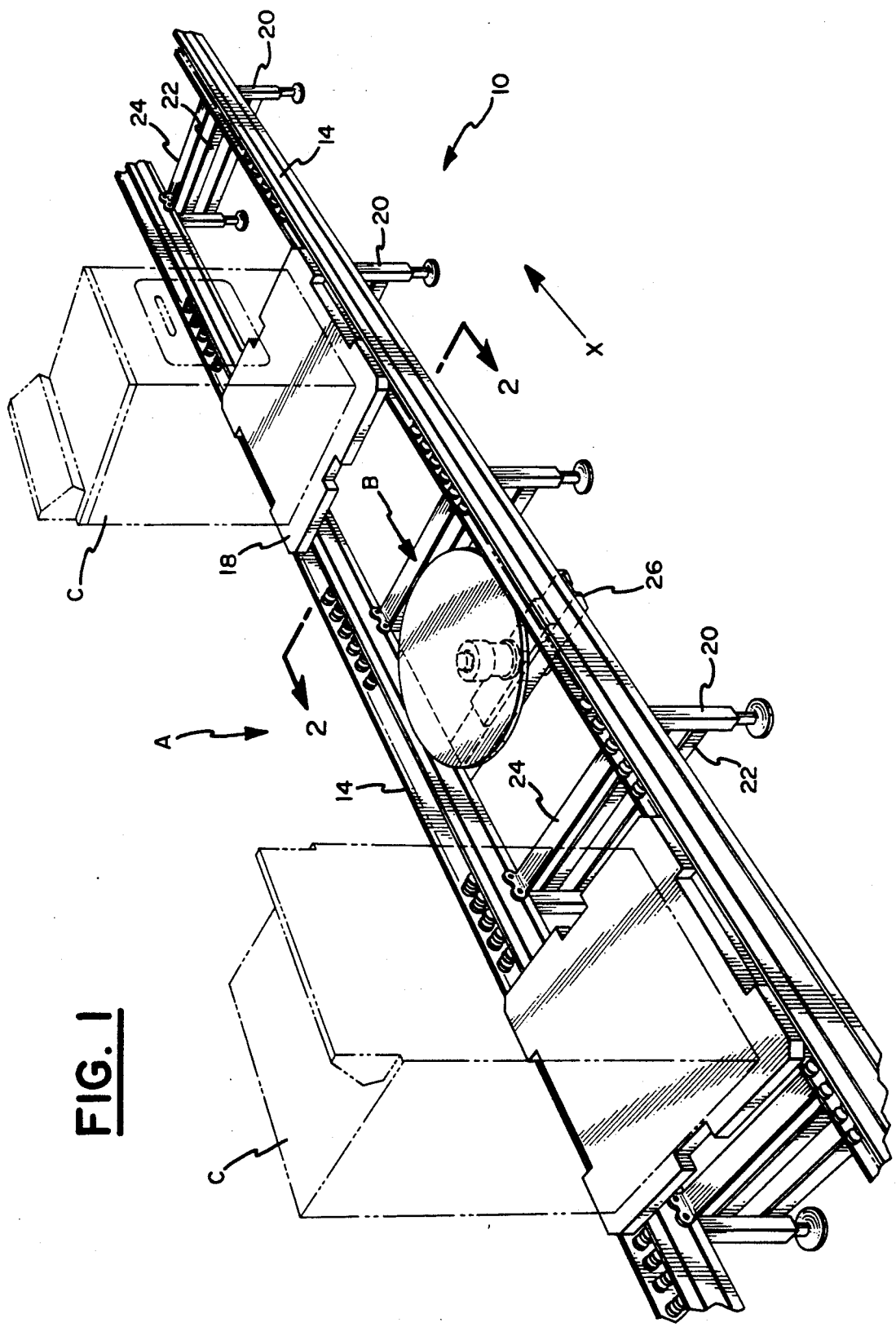
FIG. 1 is a perspective view of a portion of a conveyor system illustrating one use of a turntable cylinder according to the present invention.
Figure 6:
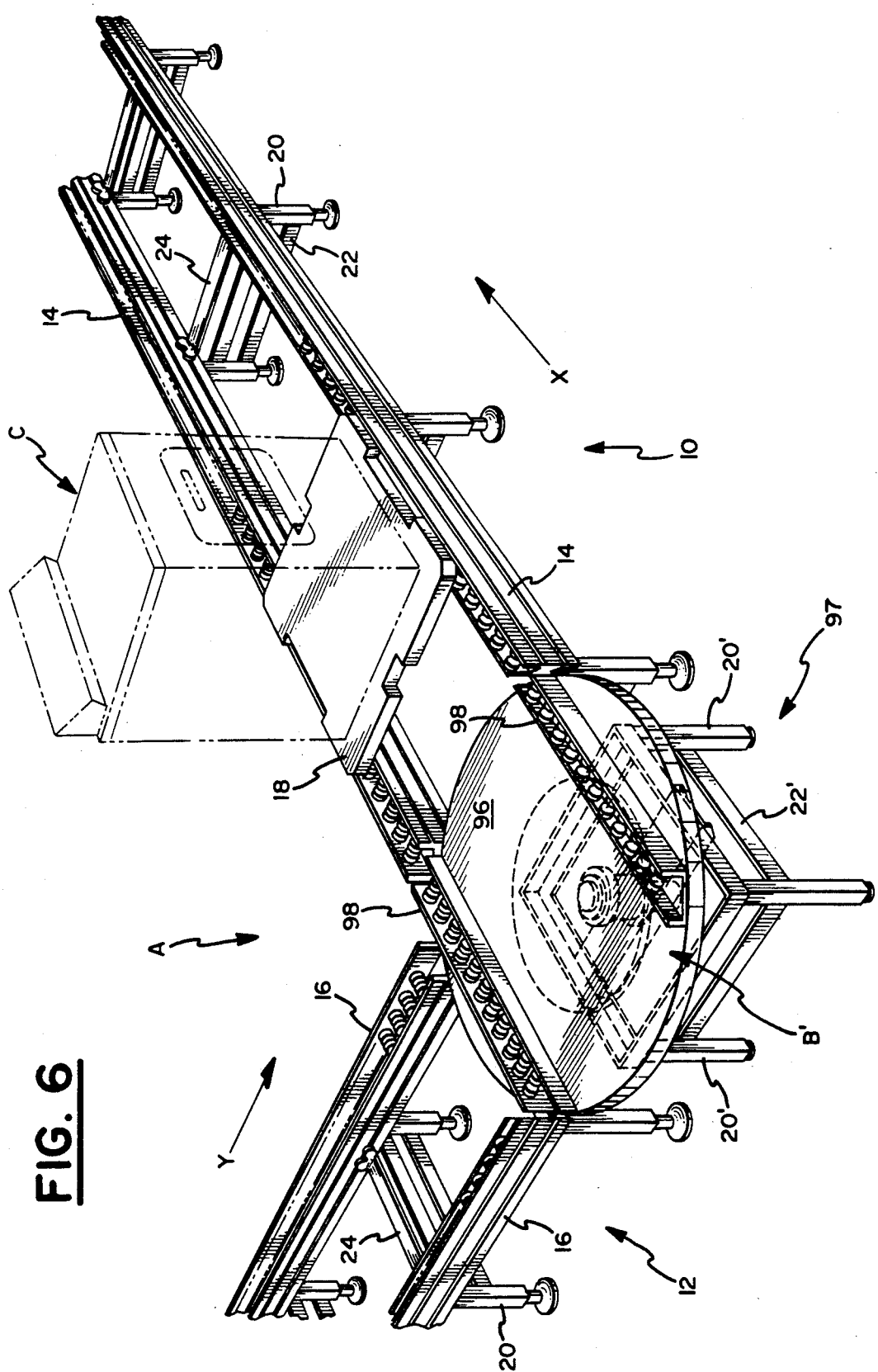
FIG. 6 is a perspective view of a dual track conveyor system employing a turntable cylinder according to the present invention as its turn-unit.

Referring to FIGS. 1 and 6, a conveyor system A may include two track sections 10, 12 representing two different paths of travel and a turntable cylinder B, B' disposed underneath a track section 10 (see FIG. 1) and at the intersection of track sections 10, 12 (see FIG. 6) in order to change the orientation of articles being transported thereon. Each track section includes two generally parallel, laterally spaced guide tracks 14, 16 positioned along the opposite sides of the paths of travel, indicated by arrows X, Y. A load, such as a clothes dryer C, is placed on a carrier plate or pallet 18 which is moved along track sections 10, 12 by conveying chains or the like. The conveying chains are schematically shown by phantom lines in the figures.

The conveyor in FIGS. 1 and 6 may be an INDUSTRALINE ® two strand conveyor manufactured by Industrial Conveyor Corporation and described in U.S. Pat. No. 4,930,623, the subject matter of which is incorporated herein. Accordingly, the conveyor system is not described in particularity herein.

In one embodiment, guide tracks 14, 16 are supported at a desired height on pillar members 20 positioned at successive intervals along the length of the respective sections. For additional strength and mechanical integrity, a number of cross-members 22 connecting pillar members 20 and braces 24 extending transversely between tracks 14, 16 may be provided. The length of cross-members 22 and braces 24 may vary to obtain conveyors of varying widths to accommodate different articles.

In order to positively and precisely reorient articles being conveyed along an assembly line, for example, a turntable cylinder B can be provided between guide rails 14 of dual track section 10. As illustrated in FIG. 1, the side of clothes dryer C facing assembly line workers can be easily changed from the front side to the rear side by rotating dryer C 180° via turntable cylinder B. While a clothes dryer is shown for simplicity in the drawing, the turntable cylinder B according to the invention can be used to smoothly reorient loads requiring rotations of any increment without interfering with delicate and precise electrical work for example. Heavier loads can be reoriented as well without tilting or damaging the component alignment of turntable cylinder B.

Another embodiment of the turntable cylinder of the invention employs a modified platform as shown in FIG. 6 and is designated B'. Turntable cylinder B' is positioned at the intersection of track sections 10, 12. With this modification, a clothes dryer C traveling in the Y direction along track section 12 can shift to track section 10 in the X direction.

TURNTABLE ELEVATING STRUCTURE

As can be seen from FIGS. 1 and 2, turntable cylinder B can be mounted on a channel 26 so that it is centrally disposed between and below conveyor chains of a track section 10 when in its lowered position. Channel mount 26 can be attached, via bolts 27 and spacer blocks 27', to the bottom of guide tracks 14 so that channel mount 26 spans track section 10 above cross-members 22. The length and width of channel mount 26 varies depending upon the width of track sections 10, 12 and the size of turntable cylinder B to be positioned there between.

Figure 2:
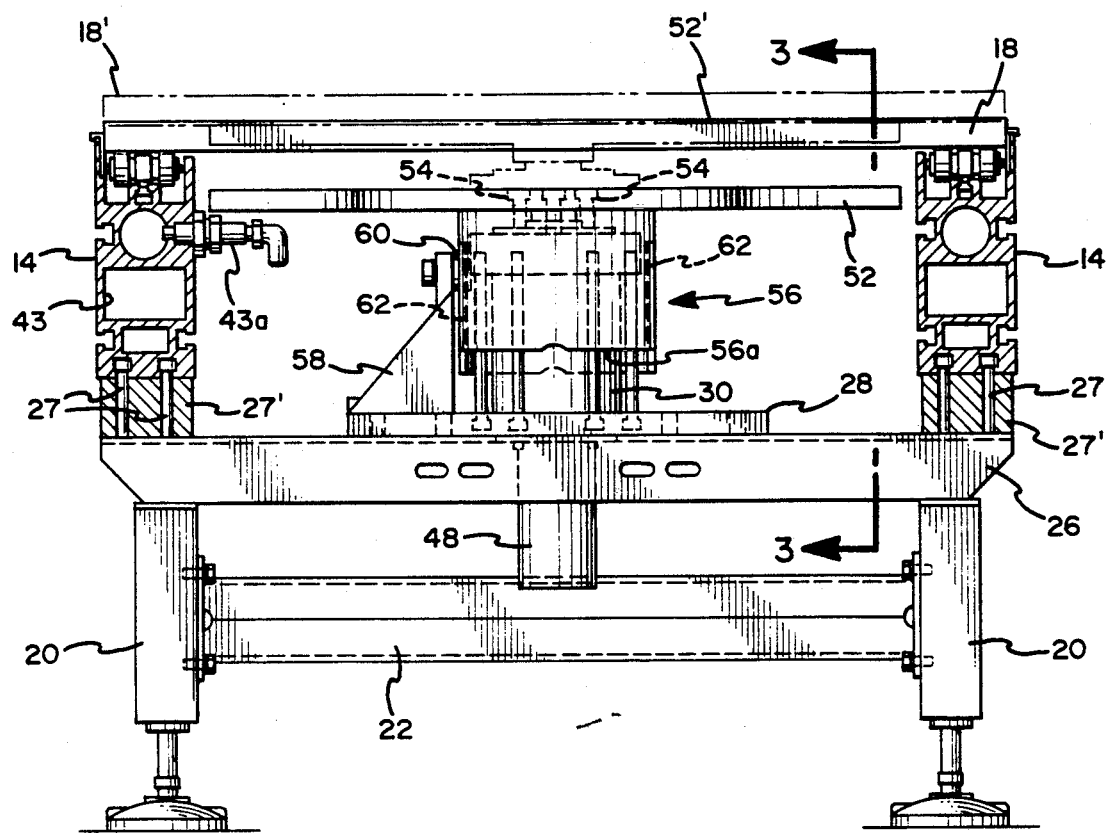
FIG. 2 is a partial sectional view, partly cross-sectioned, of a turntable cylinder of the present invention taken along lines 2—2 in FIG. 1, showing, in solid lines, the turntable cylinder in its lowered position and, in phantom, the cylinder in its extended position.

A stationary base plate 28 is attached to channel mount 26 via conventional fasteners, such as screws shown by hidden lines in FIG. 2. A cylinder 30 having a longitudinal axis L is disposed on stationary base plate 28, preferably within a circumferential groove 31 formed in base plate 28. A non-rotatable piston 32 (see FIG. 4) is received in cylinder 30.

Piston 32 is mounted for reciprocal movement along the longitudinal axis L of cylinder 30 with respect to stationary base plate 28. A pneumatic system is preferably used for the lowering and raising system as will be described below. However, a hydraulic system may be used.

In an preferred embodiment, a piston rod 34 is inserted through a hole 28a formed through base plate 28 and into piston 32 for guiding the raising and lowering of piston 32. A screw threaded bore 36 is formed in the lower end 32a of piston 32 adjacent stationary base plate 28, and a first threaded end 34a of piston rod 34 is threadedly received within threaded bore 36. Circumferential groove 31 is preferably co-axially disposed about hole 28a in base plate 28 so that piston 32 and piston rod 34 are aligned with longitudinal axis L of cylinder 30.

Base plate 28 is provided with inlet bores 28b and outlet bores 28c which communicate with the interior of cylinder 30. Appropriate fluid connection means 39 are inserted in inlets 28b and are connected via suitable hoses (not shown) to provide pressurized air of fluid to the interior of cylinder 30.

Figure 4:
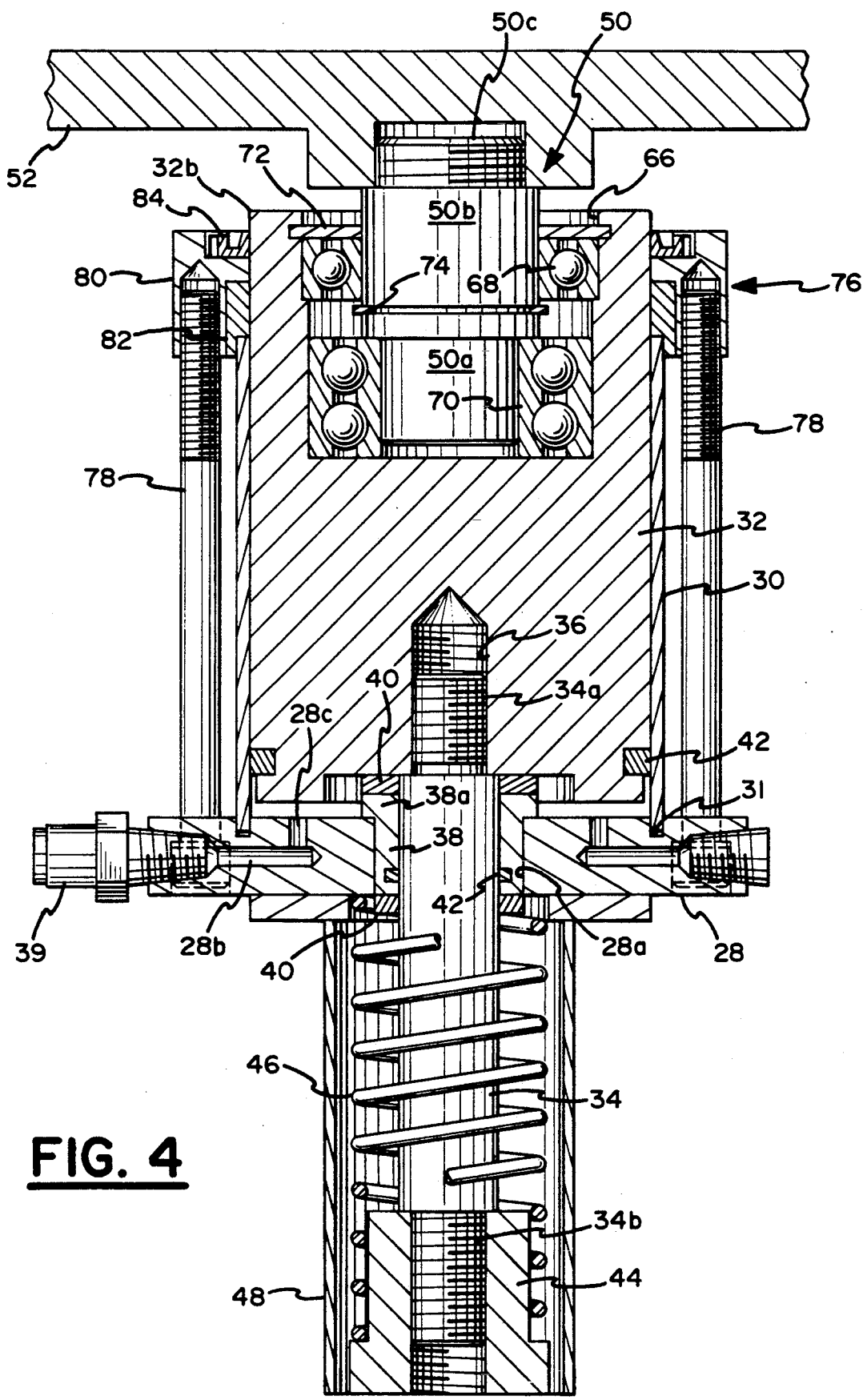
FIG. 4 is an enlarged, cross-sectional view of a turntable cylinder according to the present invention.

A bushing 38, which may be ceramic, is disposed in hole 28a which may be drilled through the center of base plate 28. Bushing 38 includes a flange 38a which extends over and rests against base plate 28 creating a seat for piston 32 in its lowered position, as shown in FIG. 4. Thus, an open space within the bottom of cylinder 30 is created for receiving a cushion of air or other appropriate fluid from outlet bores 28c. As a result of this structure, a level straight-line lifting motion is achieved as the pneumatic or hydraulic force is uniformly applied to the lower piston end 32a of piston 32. Preferably, cylinder 30 and piston 32 form a full-stroke cylinder so that, even when piston 32 is raised within cylinder 30, a substantial portion of its sidewall can rest against the interior of cylinder 30 thereby providing increased stability over standard air cylinders.

Two sealing rings 40 are positioned about piston rod 34 on either side of the bushing 38 to provide a shock absorbing cushion about bushing 38 and to seal opening 28a. In addition, lip seals 42 are disposed about the bottom ends of piston 32 and bushing 38. Other appropriate sealing means or arrangements for preventing air or fluids from escaping from the interior of cylinder 30 can be used which would be readily apparent to those having ordinary skill in the art.

As shown in FIG. 2, a source of air or fluid (not shown) may be fed through air manifold 43 in guide track 14 as described in U.S. Pat. No. 4,930,623. Outlet valves 43a are provided along track 14 to tap the pressurized air or other fluid which flows through suitable connection hoses (not shown) to fluid connection means 39 of base plate 28.

In order to limit the reciprocal movement of piston 32, a stop block 44 is screwed on the other threaded end 34b of guide rod 34. Between base plate 28 and stop block 44, a spring 46 is disposed in tension in order to absorb vibration caused by sudden pressurization within cylinder 30. Spring 46 may also serve as a return spring if a single acting cylinder is employed. For added protection, a rod guard 48 is attached to the bottom of stationary base plate 28 surrounding guide rod 34, spring 46 and stop block 44.

Figure 5:
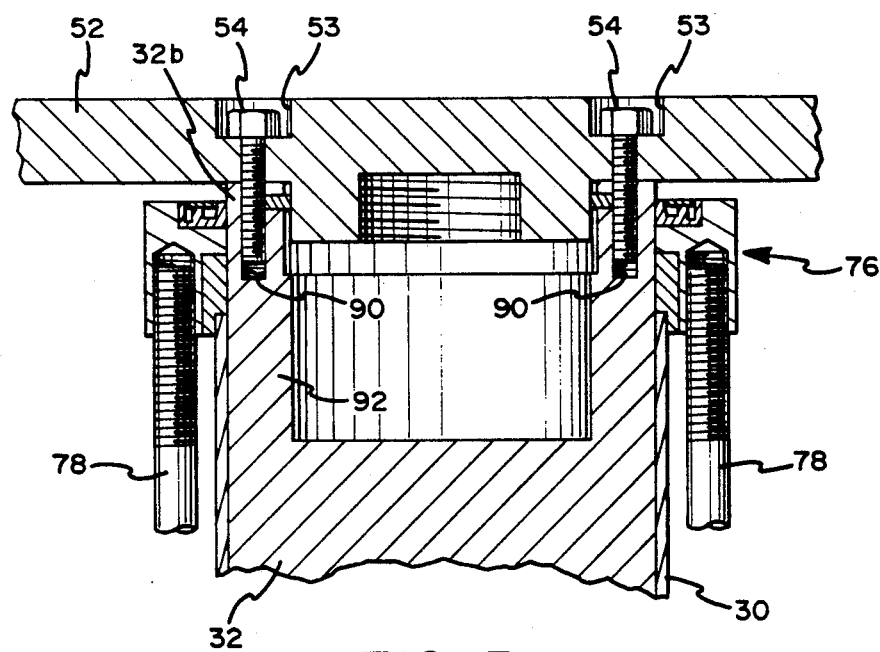
FIG. 5 is an enlarged, partial cross-sectional view of a modified turntable cylinder according to the invention.

At the upper end 34b of piston 32, a rotation bushing 50 is rotatably mounted which is capable of supporting the weight of a load C during the reorientation operation. A top plate 52 (see FIG. 2) is fastened to rotational bushing 50 (shown in hidden lines) and serves as a platform for raising an object loaded on pallet 18. The shape of top plate 52 may be round or rectangular. Top plate 52 is preferably made of metal and may have recessed surfaces 53 for receiving fasteners such as screws or bolts 54 flush therewith (see FIG. 5).

According to the invention, top plate 52 supports pallet 18 raising and lowering the same with respect to base plate 28 by the reciprocal movement of piston 32 and rotating the same via its connection with rotation bushing 50. A preferred raised position is slightly above guide tracks 14, clearing the side frames thereof, so that the raised pallet 18' avoids interference with the side frames while being supported and rotated by top plate 52' as shown in phantom in FIG. 2. As a result, pallet 18, shown in solid lines, is raised over the conveying chain or gears of the conveyor system and cannot be moved in the conveying direction while in the raised extended position. Thus, the raised and reoriented load will remain stationary while being worked on.

HUB ASSEMBLY STRUCTURE

Figure 3:
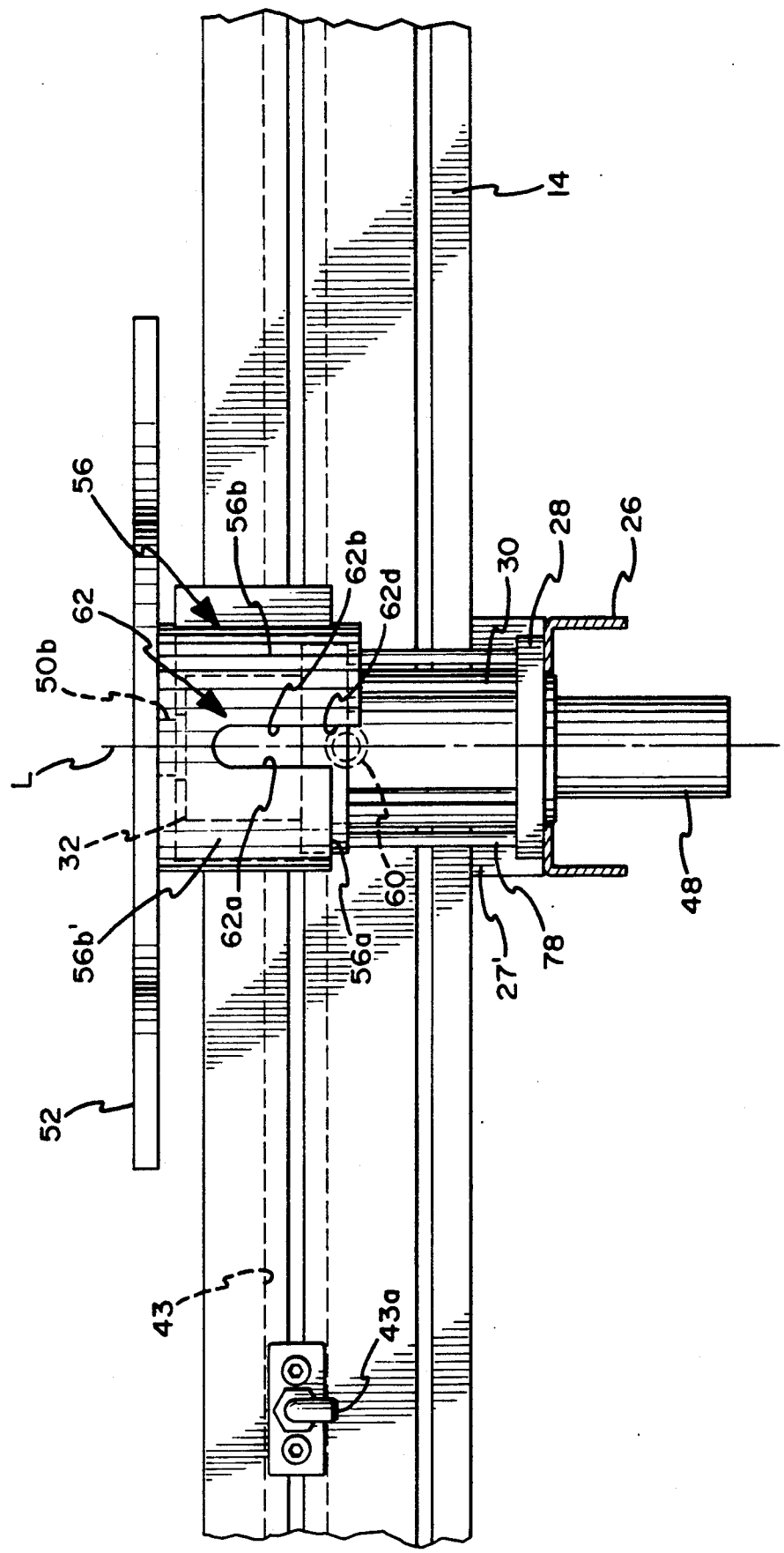
FIG. 3 is a side elevational view of the turntable cylinder of FIG. 2 in its extended position taken along line 3—3.

As can be seen from FIGS. 2 and 3, a hub assembly 56 is co-axially mounted about cylinder 30, and a locking device 58 including a rotatable cam 60 is attached to base plate 22 so that a bottom edge 56a of hub assembly 56 rests against cam 60 in the raised position. Hub assembly 56 is attached to rotation bushing 50 so that it rotates therewith and includes a side wall 56b extending over the sides of cylinder 30. Locking device 58 may be mounted so as to be stationary on base plate 28.

Hub assembly 56 may be connected to rotation bushing 50 by conventional fastening means, such as bolts 54. In addition, the connection of hub assembly 56 with top plate 52 can be achieved with fasteners or bolts 54 which can be received within recesses formed on top plate 52. As a result, top plate 52 and hub assembly 56 are connected together and rotate together with rotation bushing 50 about the longitudinal axis L of cylinder 30.

The bottom edge 56a and side wall 56b of hub assembly 56 are designed with elongated slots 62 (see FIG. 3) and/or notches 64 (See FIG. 2) for interaction with cam 60 of locking device 58. When piston 32 is in its lowered position, cam 60 is engaged with an upper portion of an elongated slot 62, thus securing hub assembly 56 and top plate 52 against rotation as shown in FIG. 2.

The spacing between slots 62 formed in hub assembly 56 would depend upon the angle of intersection of track sections 10, 12 and/or the desired rotation of a load C on top plate 52. For example, two elongated slots 62 would be disposed 180° apart on side wall 56b of hub assembly 56, as shown in hidden lines in FIG. 2, in order to reverse the forward position of a load. If a rotation in 90° increments is required, the pair of slots 62 would be spaced from each other at an 90° angle and so on. However, for a rotation of 360° only a single slot 62 is required.

Elongated slots 62 are preferably of an inverted U-shape with one leg 62a of the "U" being shorter than the other leg 62b and arranged so that the short legs 62a of elongated slots 62 face each other forming a shorter side wall portion 56b'. That is, the extension length of side wall portion 56b' is shorter than the extension length of side wall 56b between the longer legs 62b of slots 62.

Accordingly, when piston 32 (and thus, hub assembly 56) is in the raised position, cam 60 rests against a stop portion 62d of the longer leg 62b of slot 40. However, a portion of cam 60 is still between legs 62a, 62b of slot 62. As a result of this structure, hub assembly 56 can only be rotated in a single direction by applying a deliberate force to the load C supported by top plate 52. Once the initial deliberate force pushes the bottom edge 56a of hub assembly 56 over cam 60, the hub assembly will rotate until the next slot 62 is reached.

This arrangement of locking device 58 and slots 62 does not allow rotation bushing 50 to continually rotate. More importantly, locking device 58, in conjunction with slots 62, does not allow rotation of top plate 52 and its load C in either direction once cam 62 is interlocked within the legs 62a,b of slot 62. Thus, an assembly worker can even work on a light object without causing the platform to rotate.

In the elevated or raised position, cam 60 follows the contours of edge 56a of hub assembly 56 until a stop portion 62d which extends past side wall portion 56b' stops the rotational movement of hub assembly 56. At this point the load has reached its desired position and piston 32 can be lowered, causing cam 60 to interlock with slot 62 securely holding top plate 52 and hub assembly 56 against rotation.

In addition to elongated slots 62 which control the maximum amount of angular rotation allowed in one direction (i.e., clockwise or counterclockwise), temporary stop notches 64 can be formed at predetermined intervals on edge 56a of sidewall portion 56b'. These stop notches 64 may be placed at increments of 45° or other angles depending upon the desired position of the articles being assembled and the operations to be performed thereon which determine when the angle at which the article should be stopped. As cam 60 follows bottom edge 56a, it in effect, holds rotation bushing 50 in a stable position. When a temporary stop notch 64 is reached, the rotation bearing 50 and hub assembly 56 drop a distance so that cam 60 firmly rests in notch 64. Thus, an operator would be able to shift load C to reorient the load and to work on it at this temporary stop. Moreover, several and any angular orientations (e.g., 15°, 35°, 70°, etc.) are possible by providing a temporary notch 64 at the desired angle. Accordingly, the article can be precisely positioned at any desired angle.

ROTATION STRUCTURE

In a preferred embodiment, piston 32 is formed with a centrally located recess 66. The depth and width of recess 66 is sufficient for receiving rotation bushing 50 that is capable of rotating load C a predetermined angle.

Rotation bushing 50 is mounted within 2 sets of bearings 68, 70 which enable manual rotation of top plate 52. Rotation bushing 50 includes a lower part 50a of one diameter and an upper part 50b of a greater diameter. A first set of load-carrying bearings 70 is disposed in the bottom of recess 66 and surround lower body 50a when rotation bushing 50 is disposed in recess 66. Spaced a distance from load-carrying bearings 70 are side-loaded bearings 68 which surround upper body part 50b of rotation bushing 50. A snap ring or C-clip 72 secures side loading bearings 70 in place in a groove positioned on a side wall of recess 66.

Between side-loaded bearings 70 and load-carrying bearings 68, another C-clip or bearing ring 74 is attached to grooves in upper part 50b securing rotation bushing 50 within recess 66. Bearing member 74 is disposed a slight distance d below bearings 68 to enable the desired reciprocal movement of rotation bushing 50 for the above-described locking and stopping features. Accordingly, rotation bushing 50 can free-float a distance d as shown in FIG. 4. Bearing plate 74 may be aluminum, for example, and is shaped so that its outer circumference can rest against the upper ends of load carrying bearings 68.

In order to provide temporary locking positions at the bottom of slots 62 and at notches 64, cam 60 and bearing member 74 are arranged so that in the extended position, rotation bearing 50 and hub assembly 56 can be raised a slight distance above cam 60 in order to start the rotation of top plate 52. Distance d is the distance hub assembly 56 drops so that cam 60 firmly engages with temporary stop notch 64.

Upper body part 50b preferably extends above the top surface 32b of piston 32 when it is disposed within recess 66 and an attachment body 50c extends from the upper surface of upper body 50b. Attachment body 50c may include screw threads for securely attaching hub assembly 56 and/or top plate 52 thereto.

Attached to the other end of cylinder 30 is a top cap assembly 76 which additionally absorbs side load forces. Bolts 78 screw into top cap assembly 76 attaching the same to base plate 52 so that it rests against the upper end of cylinder 30 about the top end of piston 32 when it is in the lowered position as shown in FIG. 4. Top cap assembly 76 includes a metal ring 80, a bronze bearing ring 82 and a seal 84. Metal ring 80 includes threaded bores for receiving the threaded ends of bolts 78. Bronze bearing 82 rests against the top of cylinder 30 and provides additional strength to the sides of cylinder 30 enabling increased side load capacity over standard air cylinders. Seal 84 is received in a circular cut out of metal ring 80 and prevents dirt and grime from entering the small gap between piston 32 and cylinder 30.

OPERATION

Referring to FIG. 1, turntable cylinders B can be disposed intermittently between pillar members 20 of a conveying section 10 of an assembly line. Loads, such as clothes dryers C, positioned on a pallets 18 are conveyed from a first assembly position to a second assembly position located above a turntable cylinder B. As described in U.S. Pat. No. 4,930,623, a drive unit (not shown) may be provided for automatically conveying loads C and stop assemblies (not shown) may be provided at suitable locations along section 10 to temporarily stop the movement of pallets 18 above a turntable cylinder B so that load C may be handled. Once pallet 18 is properly positioned above turntable cylinder B, the appropriate outlet valve 43a can be opened providing pressurized air or other fluid to connection means 39 of base plate 28. The fluid injected into the interior of cylinder 30 causes piston 32, along with top plate 52 and load C to rise in a smooth operation. During this process, elongated slot 62 moves up while stationary cam 60 follows its legs 62a, 62b holding top plate 52 steady.

The air or fluid supply is stopped so that top plate 52 is just above the conveying chains and/or gears of conveying section 10. Spring 46 and stop block 44 ensure that the top block rises smoothly to that position. At this point, cam 60 rests between a portion of a short leg 62a and stop portion 62d (see FIG. 3).

An assembly line worker then applies a deliberate force to either pallet 18 or load C (depending on the durability and size of the load being conveyed), the assembly worker can smoothly and easily rotate pallet 18 and load C supported thereon via rotation bushing 50 while cam 60 follows along edge 56a providing additional support which steadies the supported load C. This smooth and easy rotation continues into a temporary stop notch 64 is reached.

At this point, load C is in another position for work to be done at the second assembly stage, for example as another face or apex of the load C is facing the assembly worker. After this work is completed, the assembly worker applies another deliberate force pushing notch 64 over stationary cam 60 enabling the rotation to continue in the initial direction until another stop notch 64 or an elongated slot 62 is reached.

When a slot 62 is reached, pallet 18 can be lowered onto conveying chains of track section 10 to continue forward motion of load C to a third assembly stage. Pneumatic air injected within cylinder 30 is released from the cylinder during the lowering operation, thus allowing piston 32 to fall due to gravity and spring 46. Again, slot 62 is engaged with cam 60 in the lower position securing hub assembly 56 and load C against rotation.

With turntable cylinder B of the present invention, an assembly worker can control the rotation of the load C to be worked on, as well as easily move the load about its central axis. This enables several portions of the load C to be assembled at one assembly stage. Moreover, the turntable cylinder B according to the present invention is appropriate for both heavy and light loads as a full stroke cylinder can be used for heavier loads and the hub assembly 56 together with locking device 58 provides smooth and stable rotation of both heavy and light loads.

ALTERNATIVE USES OF TURNTABLE CYLINDER

In an alternative embodiment (see FIG. 5), the upper end 32b of piston 32 may include a plurality of bores 90 co-axially disposed about recess 66 in the circumferential wall 92 of upper end 32b. As a result of this modification, piston 32 can be used with or without rotation bearing 50 and its associated bearings 68, 70. For example, if no rotation of a load C is desired but the load is desired to be locked in place, turntable cylinder B can be easily modified to delete the rotation feature by removing rotation bearing 50 and its associated bearings 68, 70 and attaching top plate 52 on top of piston 32 via bolts 54 having threaded ends which are received in threaded ends of bores 90.

Another possible use of the invention is as a turn-unit B' in a dual track conveyor system A as shown in FIG. 6. In this embodiment, the structure of turntable cylinder B is used with a conveying platform 96 attached to top plate 52 via screws (not shown). Alternatively, turntable platform 96 can be directly mounted to hub assembly 56 for rotation with rotation bearing 50.

A separate support stand 97 can be made from shortened pillars 20' and cross-members 22' to provide stable surfaces for mounting a heavy-duty channel 26 on which turn-unit B' is supported. The conveying platform 96 includes 2 guide track sections 98 of a shortened length which form a conveying track on top plate 52. The length of turntable guide tracks 98 and the size and shape of their associated platform 96 are designed so that a smooth interconnection with guide tracks 14, 16 of track sections 10, 12 is achieved.

In this operation, a pallet 18 moving in the Y direction is pushed onto the guide tracks 98 of turntable cylinder B'. This can be accomplished manually in conjunction with the driven chain of track section 12 by dog pawls attached to the driven chains or other conventional means. Once a load C is in the appropriate position on turntable guide tracks 98, an assembly worker can manually rotate turntable platform 96 and thus, pallet 18, until turntable guide tracks 98 coincide with the guide tracks 14 of track section 10 which defines the X direction of travel. The load C and pallet 18 are then pushed onto guide rails 14 and its associated conveying means and the load C continues conveying in the X direction. As described in U.S. Pat. No. 4,930,623, a motorized chain and gear arrangement can be used to rotate top turntable platform 96. If such an automated rotation is desired, the appropriate stop assemblies and conveying means are provided as known to those skilled in the art.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

We claim
1. A turntable for a conveyor system comprising:
 a) a cylinder having a longitudinal axis mounted to a stationary base plate;
 b) a non-rotatable piston disposed within said cylinder and mounted for reciprocal movement along said longitudinal axis;
 c) bushing means co-axially disposed about the cylinder axis for rotatably mounting means for supporting an article;
 d) means for stabilizing said article supporting means during rotation;
 e) said stabilizing means being co-axially mounted on said bushing means and including means for stopping said article supporting means from rotating; and
 (f) said article supporting means being raised and lowered with respect to said base plate by the reciprocal movement of said piston.

2. A turntable according to claim 1, wherein:
 a) said piston has a co-axial recess disposed about said longitudinal axis; and
 b) said bushing means is mounted within said recess.

3. A turntable according to claim 1, wherein said bushing means includes:
 a) bearings to enable manual rotation of said article supporting means; and
 b) a central bushing disposed within said bearings.

4. A turntable according to claim 3, wherein:
 a) said central bushing has a lower body part and an upper body part;

b) the diameter of said upper body part is greater than the diameter of said lower part; and
c) the upper body part extends above the upper end of said piston.

5. A turntable according to claim 4, wherein:
a) said bearings include a set of load-carrying bearings and a set of side-loaded bearings.

6. A turntable according to claim 5, wherein:
a) said load-carrying bearings surround said lower body part; and
b) said side-loaded bushing bearings surround said upper body part.

7. A turntable according to claim 6, wherein:
a) said side-loaded bearings and said load-carrying bearings are spaced from each other; and
b) said central bushing is freely mounted within said bearings for reciprocal movement therebetween.

8. A turntable according to claim 7, wherein:
a) said bushing means further includes a bearing plate disposed about said central bushing between said side-loaded and load-carrying bearings; and
b) said bearing plate limits the distance said central bushing can freely float between said bearings.

9. A turntable according to claim 1, wherein:
a) said base plate includes means for receiving a fluid; and
b) means for releasing the received fluid to and from the interior of said cylinder and for moving said piston up and down therein.

10. A turntable according to claim 9, wherein:
a) said base plate, cylinder and piston together form a full stroke cylinder.

11. A turntable according to claim 10, wherein:
a) a hole is formed in said base plate;
b) a piston rod is attached to the bottom of said piston and passes through said hole in said base plate;
c) said piston rod having a stop block attached to its opposite end to limit the reciprocal movement of said piston.

12. A turntable according to claim 11, wherein:
a) a spring is disposed about said piston rod between said base plate and said stop block.

13. A turntable according to claim 1, wherein:
a) said stabilizing means includes a hub assembly having a sidewall extending over the sides of said piston coaxially attached to said bushing means; and
b) said stopping means includes a slot formed in a sidewall of said hub assembly; and
c) a locking device mounted on said base plate for interaction with said slot to article supporting means against rotation.

14. A turntable according to claim 13, wherein:
a) said stopping means includes two slots spaced apart a distance on said sidewall limiting the rotation to a predetermined angle.

15. A turntable according to claim 14, wherein:
a) said stopping means further includes at least one stop notch formed along an edge of said hub assembly sidewall and disposed at a predetermined increment between said two slots providing a temporary stops for operator operations.

16. A conveyor system comprising:
a) first rack means for conveying articles in a first direction;
b) second track means, in communication with said first track means, for conveying articles in a second direction, said first direction being at an angle to said second direction; and
c) means for changing the direction of the articles being conveyed disposed between said first and second track means, said direction changing means including:
d) a cylinder having a longitudinal axis mounted to a stationary base plate;
e) a non-rotatable piston disposed within said cylinder and mounted for reciprocal movement with respect to said base plate;
f) bushing means co-axially disposed about the cylinder axis for rotatably mounting means for supporting an article;
g) means for stabilizing the article supporting means during rotation;
h) said stabilizing means being co-axially mounted on said bushing means and including means for stopping said article supporting means from rotating; and
i) said article supporting means being raised and lowered with respect to said base plate by the reciprocal movement of said piston.

17. A conveyor system as defined in claim 16, wherein:
a) said article supporting means includes a guide track configured for coinciding with said first track means when said article supporting means is in a first position, and for coinciding with said second track means when said article supporting means is in a second position.

18. A conveyor system as defined in claim 17, wherein:
a) said article supporting means includes a turntable platform; and
b) said guide track is disposed on said turntable platform.

19. A conveyor system as defined in claim 16, wherein:
a) said article supporting means includes a turntable platform.

* * * * *